United States Patent
Chen et al.

(10) Patent No.: US 6,283,258 B1
(45) Date of Patent: Sep. 4, 2001

(54) BRAKE ASSEMBLY WITH NOISE DAMPING

(75) Inventors: Fang Frank Chen, Rochester Hills; Ronald Louis Quaglia, Novi; Patrick J. Harwood, Farmington Hills; Shih-Emn Chen, Novi; David Dean Smit, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 9 days.

(21) Appl. No.: 09/650,435

(22) Filed: Aug. 29, 2000

(51) Int. Cl.$^7$ .................................................. F16D 69/00
(52) U.S. Cl. ........................ 188/250 E; 188/73.37; 188/264 G; 188/249
(58) Field of Search ................ 188/73.37, 250 E, 188/264 G, 73.35, 73.36, 250 B, 234, 249, 256

(56) References Cited

U.S. PATENT DOCUMENTS

| | | | |
|---|---|---|---|
| 1,673,027 | * 6/1928 | Thompson | 188/73.37 |
| 1,794,348 | * 2/1931 | Chase | 188/73.37 |
| 3,190,397 | * 6/1965 | Sudres | 188/250 B |
| 3,425,524 | * 2/1969 | Dewar | 188/218 |
| 3,490,563 | * 1/1970 | Hahm | 188/73.37 |
| 3,638,764 | * 2/1972 | Anders | 188/73.1 |
| 3,722,634 | * 3/1973 | Ogasawara et al. | 188/73.5 |
| 3,885,651 | * 5/1975 | Odier | 188/73.5 |
| 3,966,026 | * 6/1976 | Filderman | 188/73.5 |
| 4,093,045 | * 6/1978 | Kawamura | 188/73.5 |
| 4,154,322 | * 5/1979 | Yamamoto | 188/73.5 |
| 4,240,530 | * 12/1980 | Tillenburg | 188/250 E |
| 4,338,758 | * 7/1982 | Hagbjer | 52/742 |
| 4,485,898 | * 12/1984 | Bracken et al. | 188/250 B |
| 4,552,252 | * 11/1985 | Stahl | 188/73.1 |
| 4,603,760 | 8/1986 | Myers . | |
| 4,722,424 | * 2/1988 | Ikeuchi | 188/73.37 |
| 4,775,036 | * 10/1988 | Harrison | 188/250 B |
| 5,099,962 | * 3/1992 | Furusu et al. | 188/73.37 |
| 5,123,514 | * 6/1992 | Gatins | 192/107 R |
| 5,332,067 | * 7/1994 | Prudhomme | 188/73.1 |
| 5,355,986 | * 10/1994 | Biswas | 192/107 R |
| 5,388,675 | * 2/1995 | Kahr et al. | 188/250 B |
| 5,407,034 | * 4/1995 | Vydra et al. | 188/73.37 |
| 5,413,194 | * 5/1995 | Kulis, Jr. et al. | 188/251 A |
| 5,416,962 | * 5/1995 | Passarella | 29/173 |
| 5,509,508 | * 4/1996 | Evans | 188/73.38 |
| 5,515,950 | * 5/1996 | Kwolek | 188/73.36 |
| 5,518,088 | 5/1996 | Brosilow . | |
| 5,538,104 | * 7/1996 | Katz et al. | 188/73.1 |
| 5,842,546 | * 12/1998 | Biswas | 188/73.37 |
| 5,975,252 | 11/1999 | Suzuki et al. . | |
| 6,170,620 | * 1/2001 | Akita et al. | 188/251 A |
| 6,182,799 | * 2/2001 | Reuter et al. | 188/71.1 |

* cited by examiner

*Primary Examiner*—Robert J. Oberleitner
*Assistant Examiner*—Benjamin A. Pezzlo
(74) *Attorney, Agent, or Firm*—Gregory P. Brown

(57) ABSTRACT

A brake assembly includes a rotor and at least one backplate supporting a brake pad for frictionally engaging the rotor for braking. A sheet metal plate is operatively connected to the back plate. The sheet metal plate has a groove cut therethrough to form at least one tuning fork member. A damping material is engaged with the at least one tuning fork member for damping energy associated with vibrations of the tuning fork member, thereby sound-dampening brake squeal noise.

16 Claims, 3 Drawing Sheets

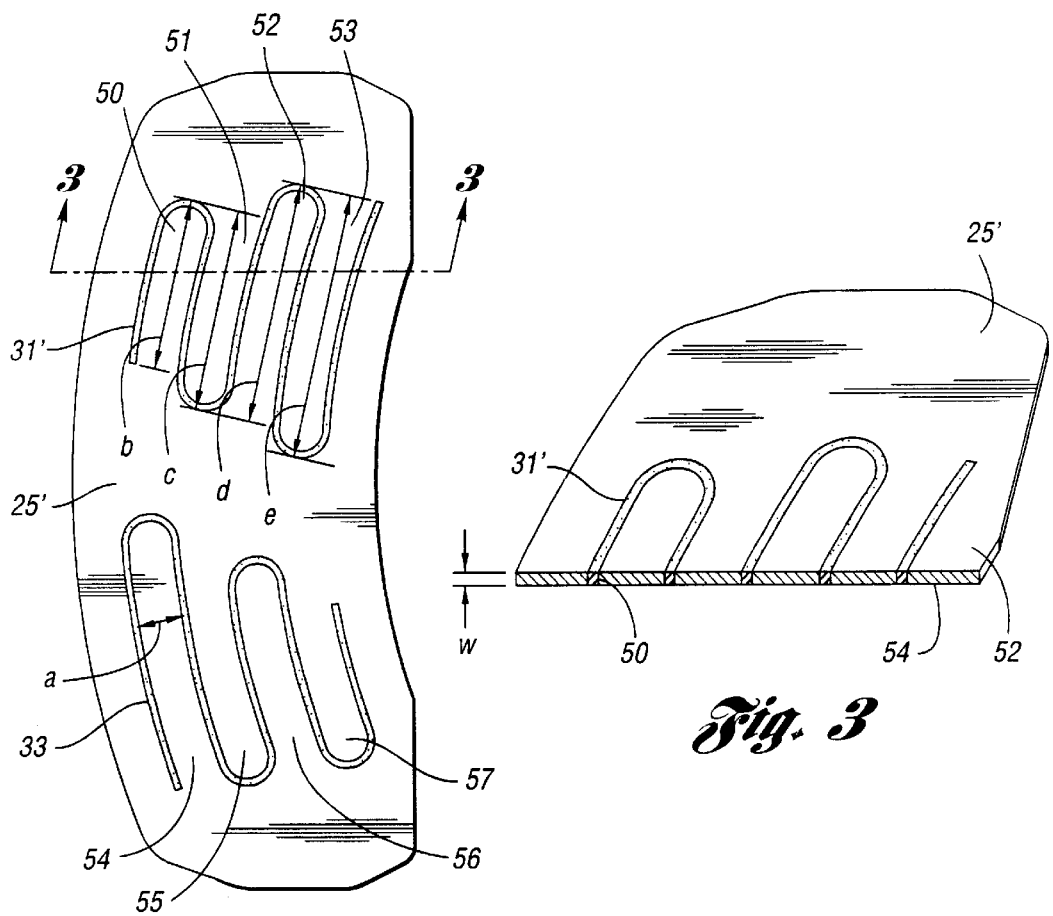
Fig. 2
Fig. 3
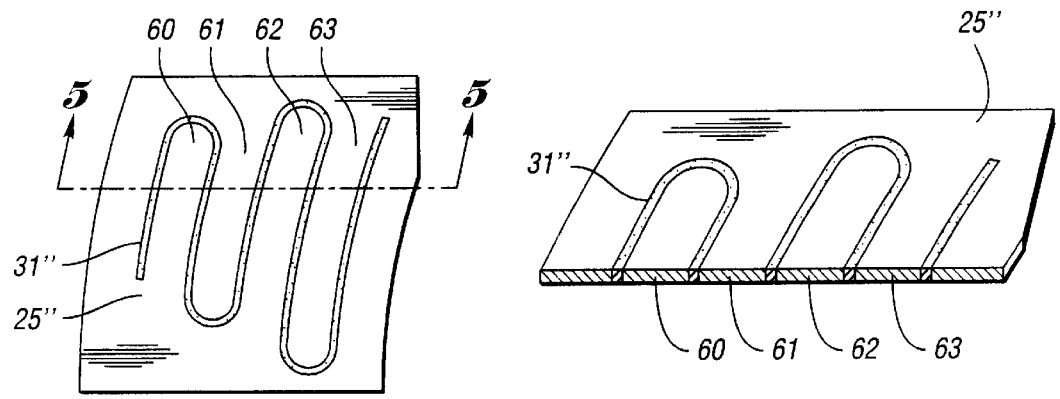
Fig. 4
Fig. 5

BRAKE ASSEMBLY WITH NOISE DAMPING

TECHNICAL FIELD

The present invention relates to a brake assembly with noise damping and, more particularly, to a brake assembly including a sound damping member having a plurality of tuning fork members formed therein and engaged with a damping material to damp vibrations of the brake assembly.

BACKGROUND OF THE INVENTION

In disc brake assemblies, a rotatable rotor rotates with the axle of a wheel to be braked. Two friction pad structures are disposed on opposite sides of the rotor. Each friction pad structure comprises a steel backing plate and a brake pad. The friction pad structures are moved inwardly, toward one another, under the force applied by a hydraulically-actuated piston and related caliper fingers of a caliper mounting structure. The plates are moved outwardly, away from one another, by return springs.

When the pistons and caliper fingers press the backing plates inwardly, the inner surfaces of the brake pads are engaged in frictional, braking contact with the rotor. A relatively high pitched and undesired brake squeal noise can be produced during such braking engagement of the pads on the rotor. The brake squeal noise is produced by vibration of the friction pad structures during braking actuation.

To reduce the undesired brake squeal noise, sound-dampening shim constructions have been used, both by original equipment manufacturers and by brake repair shops. The sound-dampening shim constructions have been positioned both between the hydraulically-actuated piston and the piston engaging surface of the related steel backing plate, and also between the caliper fingers and the caliper contact surface of the related steel backing plate. One such shim structure is shown in U.S. Pat. No. 5,518,088.

It is desirable to provide an improved apparatus for sound-dampening brake squeal noise in which the brake squeal noise is reduced, and a variety of brake squeal frequencies may be absorbed.

DISCLOSURE OF INVENTION

The present invention provides an improved apparatus for sound-dampening brake squeal noise by providing a sound damping member as part of a brake assembly, wherein the sound damping member includes tuning fork members formed therein in engagement with a damping material for damping vibrations at selected frequencies.

More specifically, the present invention provides a brake assembly including a rotor and at least one backplate supporting a brake pad for frictionally engaging the rotor for braking. The damping member is a sheet metal plate which is operatively connected to a braking component, such as the backplate, and has a groove cut therethrough to form at least one tuning fork member. A damping material is engaged with the tuning fork member for damping energy associated with vibrations of the tuning fork member, thereby sound-dampening brake squeal noise.

Preferably, the groove forms multiple tuning fork members of varying length in the sheet metal plate to damp various frequencies of vibrations.

The damping material may be provided in the groove, or against one or both opposing sides of the sheet metal plate. The damping material may be a rubber-like or viscoelastic material.

The length of the tuning fork members and the thickness of the sheet metal plate may be tuned for absorption of a desired range of vibration frequencies.

In another embodiment, the backplate itself is the damping member, wherein the tuning fork members are formed by the backplate.

Accordingly, an object of the invention is to provide an improved apparatus for sound-dampening brake squeal noise in a brake assembly by providing tuning fork members engaged with a damping material for damping vibrations.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 shows a plan view of an energy absorbing sheet metal plate in accordance with a second embodiment of the invention;

FIG. 3 shows a perspective sectional view taken at line 3—3 of FIG. 2;

FIG. 4 shows a plan view of an energy absorbing sheet metal plate in accordance with a third embodiment of the invention;

FIG. 5 shows a perspective sectional view taken at line 5—5 of FIG. 4;

DETAILED DESCRIPTION OF THE PREFERRED EMBODIMENTS

Figure 1:
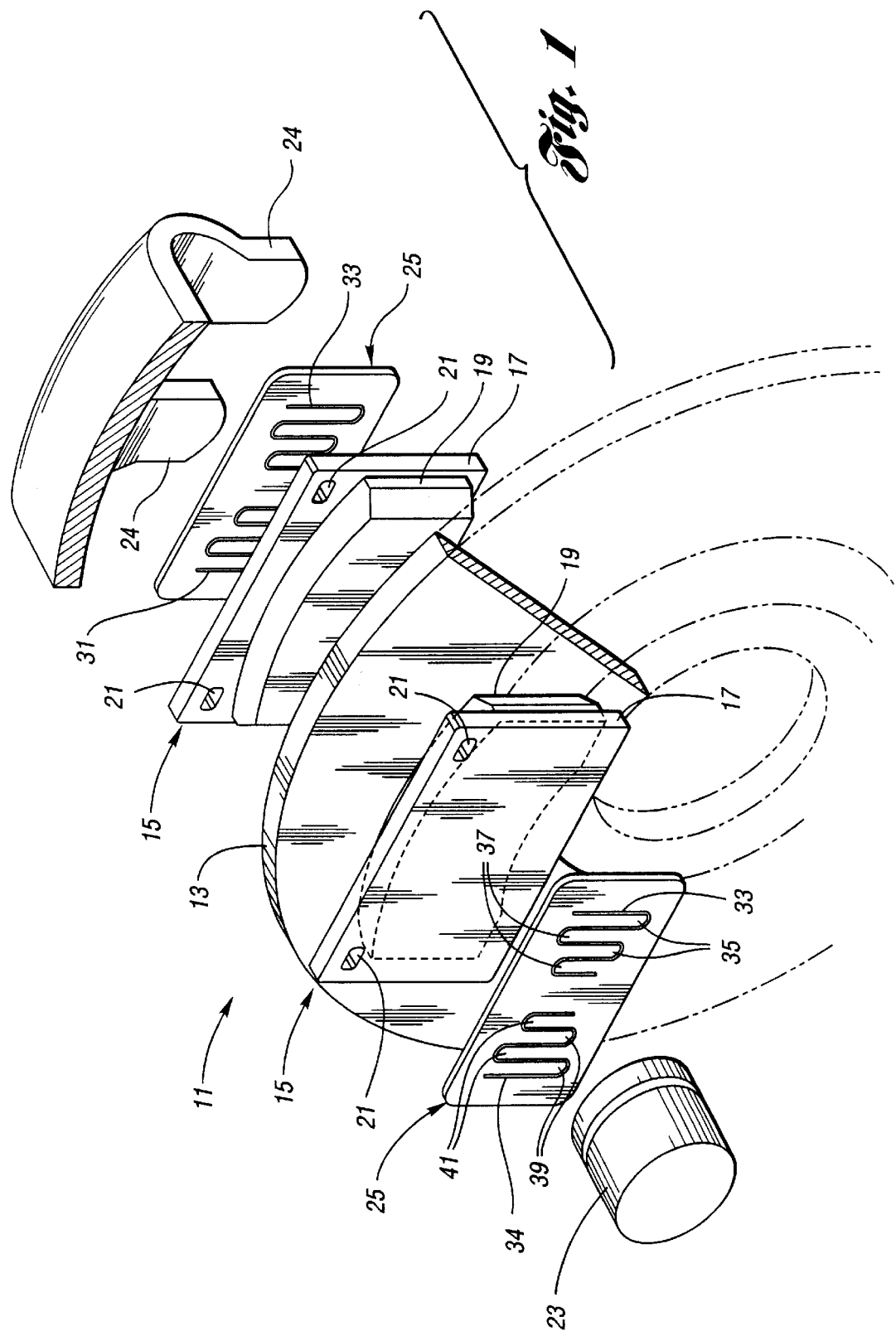
FIG. 1 shows an exploded perspective view of a brake assembly in accordance with a first embodiment of the invention.

FIG. 1 is an exploded, isometric view of a disc brake apparatus indicated generally by the reference numeral 11. The disc brake apparatus 11 includes a rotatable rotor 13 which rotates with the axle of a wheel to be braked. The disc brake apparatus 11 also includes two braking components 15. Each braking component 15 comprises a steel backing plate 17 and a brake pad 19 which is mounted on the rotor side of the steel backing plate.

The two backing plates 17 are suspended in a conventional caliper mounting structure (not shown in FIG. 1) by rods which extend through openings 21 in the upper corners of the backing plates 17. This caliper mounting permits the backing plates to move axially on the support rods.

The plates are moved inwardly toward one another under forces supplied by a hydraulically actuated piston 23 and the related caliper fingers 24. When the piston 23 and fingers 24 press the backing plates inwardly, the inner surfaces of the braking pads 19 are engaged in frictional, braking contact with the rotor 13.

A relatively high pitched and undesired brake squeal noise can be produced during such braking contact. A brake squeal noise often occurs after the brake pads are replaced, but brake squeal noise can occur at other times for a variety of reasons.

The brake squeal noise is of a relatively high frequency, and is produced by vibration of the braking component 15 during braking actuation.

The vibration can be produced during the burnishing-in process of the friction pads 19 on the rotor 13. There is a certain amount of porosity in the surfaces of both the rotor and the brake pads 19. The porosity of the surfaces can produce vibrations in the braking components 15 until the interengaged surfaces have been rubbed together sufficiently long to eliminate or to substantially reduce the porosity and to become burnished surfaces.

The back surface of the steel backing plates 17 can also have a certain amount of unevenness in finish which can present high spots engageable with the piston 23 and/or caliper fingers 24; and this can also lead to some undesired vibrations of the braking components 15.

In order to reduce and/or eliminate the undesired brake squeal noise, noise damping sheet metal plates 25 are attached to the backing plates 17 for absorbing and damping vibrations within a predetermined frequency range. Each noise damping sheet metal plate 25 includes grooves 31,33 cut completely through the plates 25 from one side to another to form a plurality of tuning fork members 35,37, 39,41 of varying lengths. In this configuration, vibration of the braking components 15 induces vibrations in the tuning fork fingers. As described more clearly below with reference to further embodiments of the invention, a damping material is engaged with the tuning fork fingers 35,37,39,41 for damping energy of such vibrations to reduce or eliminate brake squeal noise. The damping material may be a rubber-like or viscoelastic material, and may be positioned within the grooves 31,33 and/or on one or both opposing faces of the sheet metal plates 25.

The thickness of the sheet metal plates 25, and the length, shape and orientation of the tuning fork fingers may be tuned to absorb frequency vibrations in specific ranges.

Turning to FIGS. 2 and 3, a second embodiment of the invention is shown. In this embodiment, the noise damping sheet metal plate 25' includes grooves 31',33' formed therethrough to form fingers 50,51,52,53,54,55,56,57, as illustrated in FIG. 2. Preferably, each finger has a width dimension (a) of 7 millimeters. By way of example, finger 50 has a length (b) of 20 millimeters, finger 51 has a length (c) of 25 millimeters, finger 52 has a length (d) of 30 millimeters, and finger 53 has a length (e) of 35 millimeters. Accordingly, preferably each finger has a length at least approximately three times its width. By providing variations in the length of the fingers, vibrations of various frequencies can be absorbed.

As shown in FIG. 3, the plate 25' has a width (w) of 1 millimeter. The groove 31' is preferably approximately 300 $\mu$m in width and is filled by a damping material 50 for energy absorption. As mentioned previously, the damping material 50 may also be applied to the top and bottom faces 52,54 of the plate 25'.

FIGS. 4 and 5 show a slightly modified third embodiment which includes only a single groove 31" formed in the sheet metal plate 25" to form the tuning fork members or fingers 60,61,62,63.

Figure 6:
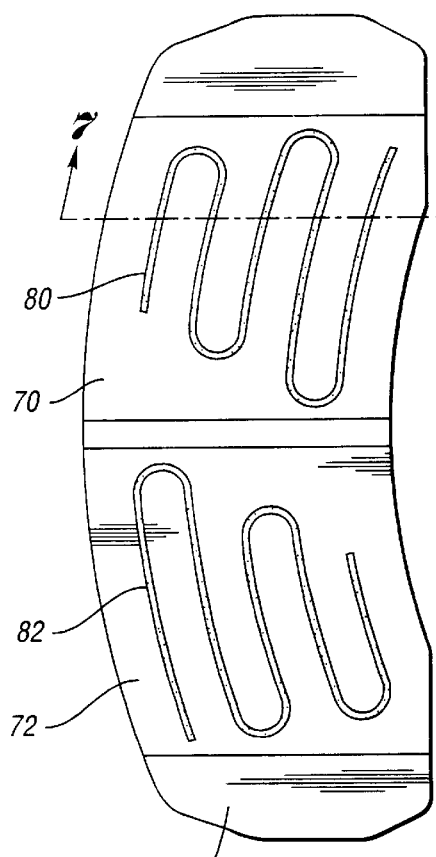
FIG. 6 shows a plan view of an energy absorbing sheet metal plate integrated with a conventional insulator in accordance with a fourth embodiment of the invention.
Figure 7:
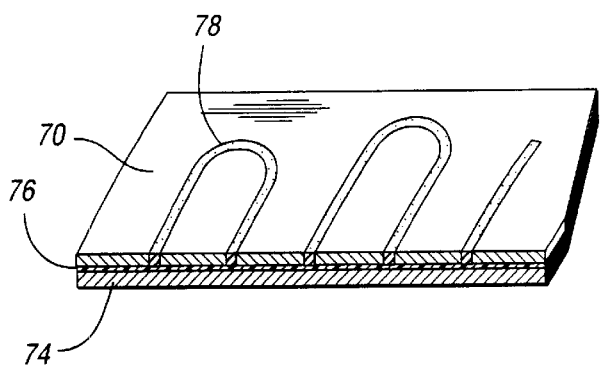
FIG. 7 shows a perspective sectional view taken at line 7—7 of FIG. 6.

Turning to FIGS. 6 and 7, a fourth embodiment of the invention is shown, in which sheet metal plates 70,72, which in this instance are identical to the plate 31" shown in FIG. 4, are applied to a conventional insulator 74 by means of adhesive 76 (or any other bonding technique), and a damping material 78 is provided within the grooves 80,82 for brake squeal noise dampening. The conventional insulator 74 may be any insulator secured to a brake pad backing plate, such as that shown in U.S. Pat. No. 4,603,760, which is hereby incorporated by reference in its entirety.

The shape of the sheet metal plate will be designed to fit the specific caliper or piston design so that the tuning fork fingers can freely vibrate without interference from the caliper, piston or backing plate. Alternatively, the grooves could be cut into a conventional insulator plate within the scope of the present invention (i.e. the "sheet metal plate" is the insulator). Also, this invention could be applied to a brake drum assembly with certain modifications well within the skill level of one of ordinary skill in the art based upon the teachings of this application.

Figure 8:
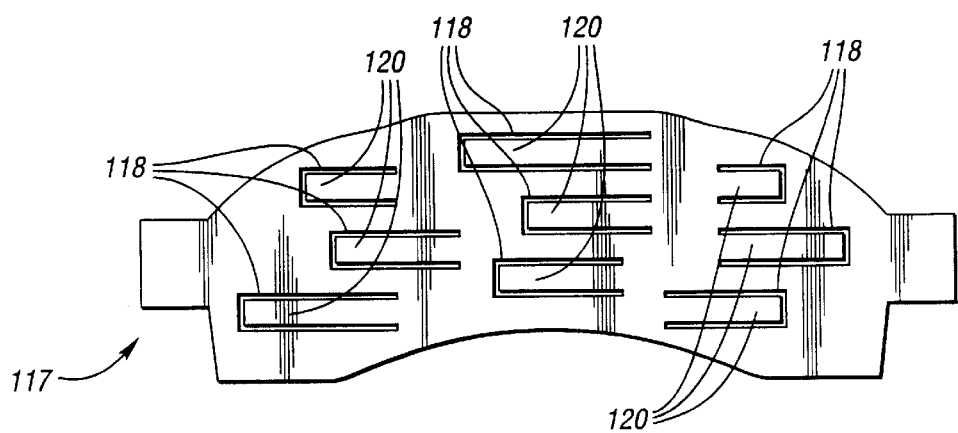
FIG. 8 shows a schematic plan view of a backing plate in accordance with a fifth embodiment of the invention.

FIG. 8 shows a schematically arranged plan view of a backing plate 117 in accordance with a fifth embodiment of the invention, wherein the sound damping member is the backing plate 117 itself. As shown in FIG. 8, a plurality of grooves 118 are cut completely through the backing plate 117 to form the tuning fork members 120. As described above with respect to the previous embodiments, a damping material fills the slots 118 for sound-dampening. The liner or brake pad is molded onto the front side of the back plate 117. The tuning fork members 120 are not adhered to the brake pad so that they are free to vibrate and not constrained by the brake pad. The damping material preferably has a high damping coefficient and can resist heat. The length and width of the tuning fork members 120 can be adjusted for tuning to specific frequency ranges. The typical insulator may be eliminated, or may be attached to the backside of the backing plate 117.

While the best modes for carrying out the invention has been described in detail, those familiar with the art to which this invention relates will recognize various alternative designs and embodiments for practicing the invention within the scope of the appended claims.

What is claimed is:

1. A brake assembly comprising:
    a rotor;
    a brake pad positioned for selective engagement with the rotor for braking;
    a sound damping member operatively connected to the brake pad, said sound damping member having a groove cut therethrough to form at least one tuning fork member, and having a damping material engaged with said at least one tuning fork member for damping energy associated with vibrations of the tuning fork member, thereby sound-dampening brake squeal noise, wherein said groove forms a generally sine-wave shape in the sound damping member.

2. The brake assembly of claim 1, wherein said sound damping member comprises a backplate supporting the brake pad.

3. The brake assembly of claim 1, further comprising a backplate supporting the brake pad, and wherein said sound damping member comprises a sheet metal plate connected to said backplate.

4. The brake assembly of claim 1, wherein said at least one tuning fork member comprises multiple tuning fork members of varying length to damp various frequencies of vibrations.

5. The brake assembly of claim 1, further comprising a second groove cut through the sound damping member to form additional tuning fork members.

6. The brake assembly of claim 1, wherein each said tuning fork member is at least approximately three times as long as it is wide.

7. The brake assembly of claim 1, wherein said damping material at least partially fills the groove.

8. The brake assembly of claim 3, further comprising an insulator positioned between the sheet metal plate and the backplate.

9. The brake assembly of claim 1, wherein said damping material comprises a rubber-like material.

10. A brake assembly comprising:
- a braking component operative to apply a braking force to a vehicle wheel, said braking component being subject to vibration during braking;
- a sheet metal plate operatively connected to the braking component, said sheet metal plate having a groove cut therethrough to form at least one tuning fork member, wherein each said tuning fork member is at least approximately three time as long as it is wide; and
- a damping material engaged with said at least one tuning fork member for damping energy associated with vibrations of the tuning fork member, thereby sound-dampening brake squeal noise.

11. The brake assembly of claim 10, wherein said at least one tuning fork member comprises multiple tuning fork members of varying length to damp various frequencies of vibrations.

12. The brake assembly of claim 10, wherein said groove forms a generally sine-wave shape in the sheet metal plate.

13. The brake assembly of claim 10, further comprising a second groove cut through the sheet metal plate to form additional tuning fork members.

14. The brake assembly of claim 10, wherein said damping material at least partially fills the groove.

15. The brake assembly of claim 10, further comprising an insulator positioned between the sheet metal plate and the backplate.

16. The brake assembly of claim 10, wherein said damping material comprises a rubber-like material.

* * * * *